(12) United States Patent
Hirai et al.

(10) Patent No.: US 6,527,993 B1
(45) Date of Patent: Mar. 4, 2003

(54) METHOD FOR PRODUCING FOAMED-IN-MOLD PRODUCT OF AROMATIC POLYESTER BASED RESIN

(75) Inventors: Takaaki Hirai, Nara (JP); Minoru Fujishima, Nara (JP); Hiroyuki Ueno, Nara (JP); Hideyasu Matsumura, Shiga (JP); Ikuo Morioka, Shiga (JP); Yukio Aramomi, Shiga (JP); Hiroyuki Yamagata, Shiga (JP)

(73) Assignee: Sekisui Plastics Co., Ltd., Osaka (JP)

(*) Notice: Subject to any disclaimer, the term of this patent is extended or adjusted under 35 U.S.C. 154(b) by 0 days.

(21) Appl. No.: 09/856,469

(22) PCT Filed: Dec. 10, 1999

(86) PCT No.: PCT/JP99/06987

§ 371 (c)(1),
(2), (4) Date: Jun. 7, 2001

(87) PCT Pub. No.: WO00/35650

PCT Pub. Date: Jun. 22, 2000

(30) Foreign Application Priority Data

Nov. 12, 1998 (JP) .......................... 10-353327
Jul. 12, 1999 (JP) .......................... 11-198025

(51) Int. Cl.$^7$ ............................................ B29C 44/02
(52) U.S. Cl. .......................... 264/50; 264/51; 264/55
(58) Field of Search ........................ 264/50, 51, 55; 521/56

(56) References Cited

U.S. PATENT DOCUMENTS

| | | | | |
|---|---|---|---|---|
| 4,587,272 A | * | 5/1986 | Avakian et al. | 521/86 |
| 5,134,028 A | * | 7/1992 | Hayashi et al. | 428/332 |
| 5,271,886 A | * | 12/1993 | Collom et al. | 264/50 |
| 6,306,921 B1 | * | 10/2001 | Al Ghatta et al. | 521/182 |
| 6,352,426 B1 | * | 3/2002 | Hutchinson et al. | 425/548 |

FOREIGN PATENT DOCUMENTS

| | | |
|---|---|---|
| JP | 51-34963 | 3/1976 |
| JP | 51-50365 | 5/1976 |
| JP | 59-135237 | 8/1984 |
| JP | 60-087043 | 5/1985 |
| JP | 2-251543 | 10/1990 |
| JP | 8-174590 | 7/1996 |

* cited by examiner

*Primary Examiner*—Allan R. Kuhns
(74) *Attorney, Agent, or Firm*—Rader, Fishman & Grauer PLLC

(57) ABSTRACT

The present invention provides a process for producing a molded foam article of a crystalline aromatic polyester resin. The process is characterized by heating the surface temperature of a mold for cavity-molding to the temperature within a range of from (td+35) to (Tg+57)°C. (Tg is a glass transition temperature of the crystalline aromatic polyester resin prepuffs), thereby to mold prepuffs, and cooling the surface of the mold to a temperature not lowered than Tg for at least 20 seconds.

18 Claims, 1 Drawing Sheet

METHOD FOR PRODUCING FOAMED-IN-MOLD PRODUCT OF AROMATIC POLYESTER BASED RESIN

TECHNICAL FIELD

The present invention relates to a process for producing a molded foam article of a crystalline aromatic polyester resin and, more particularly, to a process for producing a molded foam article used in industrial parts, food containers or the like, which is superior in various characteristics such as low density and heat resistance and has a good appearance.

BACKGROUND OF THE INVENTION

An aromatic polyester resin represented by a polyethylene terephthalate has widely been used in the fields of electric/electronic parts, automotive parts, industrial parts, and packagings such as film and bottle containers because of its comparatively low price, excellent chemical properties such as chemical resistance, solvent resistance and weathering resistance, and physical properties such as heat resistance, rigidity and gas-barrier property. Therefore, trials to produce a molded foam article containing an aromatic polyester resin as a base resin, which is lightweight and has excellent insulating properties and cushioning properties, have been made. For example, Publication of Unexamined Patent Application No. JP 51-50365, A (1976) discloses a potentially foamable polyester fiber produced by impregnating an unstretched fiber, which is obtained by wet spinning or dry spinning of a high-melting point polyester, with a low-boiling point liquid which is insoluble or slightly soluble in the polyester. This publication also discloses that a polyester foam was obtained by heating the potentially foamable polyester fiber to the temperature higher than its plastication temperature. Publication of Unexamined Patent Application No. JP 59-135237, A (1984) discloses a foamed linear polyester resin, and also discloses that a food container capable of being heated in an oven can be obtained by forming a sheet of the foamed resin.

However, an object of the former publication is to finally obtain a thread-like foam by spinning a polyester to form a thread-like product, impregnating the product with a low-boiling point liquid as a blowing agent, and dipping in an oil bath, thereby to foam the product. Therefore, the former publication does not suggest a technical idea of processing the thread-like foam again to mold a molded foam article other than the thread-like product itself. The latter publication discloses that a foamed sheet is produced by treating a blend of a linear polyester/polycarbonate at high temperature and conducting extrusion foaming of the blend using carbon dioxide released from polycarbonate as a blowing agent to produce a foamed sheet. Only sheets having a density of 0.83 g/cm$^3$ are described in the Examples of the publication. Therefore, a foam having a lower density is hardly obtained.

In Publication of Unexamined Patent Application No. JP 2-251543, A (1990), the present applicant has already suggested a process for producing a low density foamed sheet in an industrial manner, and has succeeded in practical application. As a result, it became possible to form the sheet into a lightweight container having a desired shape by a process such as vacuum forming and matched-mold forming using such a low-density foamed sheet.

As described above, various studies of thermally forming a foamed sheet produced by extrusion foaming to obtain a container such as food tray have been made. However, a so-called cavity-molding process of aromatic polyester resin prepuffs using a mold, followed by cooling and further removal from the mold to obtain a molded foam article having an arbitrary shape wherein the prepuffs are expanded and fused has never been studied sufficiently. The present applicant also has studied intensively about this process.

To obtain a molded foam article of a polystyrene resin by the cavity-molding process, the molded foam article is produced through the step of impregnating resin particles with a blowing agent, pre-expanding the resin particles so impregnated (so called prepuffs), and cavity-molding (expanding and fusing) the prepuffs. However, in case where these steps are applied to a polyester resin, a long time is required in the step of impregnating with the blowing agent or impregnation is not conducted because the polyester resin is superior in gas-barrier property. The crystallinity of the prepuffs is excessively high by heating on impregnation and pre-expanding and the prepuffs are not fused each other on cavity-molding and, therefore, a molded foam article is not obtained.

Thus, the present applicant has found that the crystallinity of prepuffs can be set to 25% or less by employing the step of melt-kneading a polyester resin and a blowing agent, conducting extrusion foaming of the mixture using an extruder, and cutting the resulting foamed extrudate to give prepuffs and that the prepuffs are expanded and fused each other by cavity-molding to obtain the desired molded foam article {Publication of Unexamined Patent Application No. JP, 8-174590, A (1996)}.

This molded foam article is free from gaps between prepuffs and has a useful heat resistance.

However, prepuffs made of a general purpose polyester resin having a crystallization peak temperature lower than 130° C. is used in this molded foam article and, therefore, the crystallization rate is considered very fast. Therefore, the fusion rate is improved by controlling the crystallinity of the prepuffs to 25% or less, thereby making it possible to provide a molded foam article by fusing the prepuffs each other to some extent. However, the fusion ratio of prepuffs is 20% at most and a molded foam article having sufficient fusion ratio such as 30% or more could not be obtained.

Since the crystallinity of the molded foam article could be enhanced to 20% or more, the heat resistance can be imparted. However, since the fusion ratio is insufficient, the dimensional change on heating at 140° C. for 24 hours is at least about 2.5% and could not be controlled to 2% or less.

Recently, a molded foam article whose dimensional change on heating at 140° C. for 24 hours is controlled to 2% or less, preferably 1% or less, has been required for applications such as industrial parts and automotive parts, however the molded foam article could not respond to these requirements.

On the other hand, when the crystallization rate of a polyester resin is inhibited, for example, when the crystallization peak temperature is adjusted to 130–180° C., the crystallinity of prepuffs can be reduced to 8% or less. Since the crystallinity is inhibited, proceeding of the crystallinity on cavity-molding can also be inhibited and the fusion of the prepuffs can be improved to excellent fusion ratio of not less than 40%.

When the crystallization rate is inhibited, the fusion can be improved. However, in case where the molded foam article is produced by a general process for cooling immediately after the completion of molding, removing the molded foam article from the mold, so-called sink wherein the center portion of the molded foam article shrinks immediately after removal from the mold, which is considered to be caused by low crystallinity of the molded foam article, occurs and the mature step of aging until sink is restored is required.

This sink is a phenomenon wherein the thickness of the plate-like molded foam article varies from the side portion to the center portion and the center portion is thin. This phenomenon is particularly remarkable in the prepuffs wherein the crystallization rate was inhibited. Therefore, even if the molded temperature is raised or the mold time is prolonged, to thereby to accelerate crystallization and to inhibit sink, melt marks are formed on the surface of the molded foam article, resulting in poor appearance. Therefore, it is difficult to produce a good molded foam article.

Accordingly, a mature period for several weeks until sink is restored after the production of the molded foam article of the aromatic polyester resin is required. Therefore, the mature period and place for maturing can cause an increase in cost.

If the above-described problems are solved, it is expected that the molded foam article of the aromatic polyester resin finds its way into a variety of applications such as building materials, construction materials, industrial members, automotive parts, etc., as a more highly functional material than that of conventional polystyrene or polyolefin products taking advantage of the excellent characteristics described above.

OBJECTS OF THE INVENTION

An object of the present invention is to provide a process for producing a molded foam article, which has sufficient fusion ratio such as about 30% or more and excellent dimensional stability capable of inhibiting the dimensional change ratio on heating, even in case of using prepuffs of the general purpose polyester resin. Such a molded foam article can be suitably used in applications such as industrial parts and automotive parts.

In this invention, in the case where cavity-molding is conducted by using prepuffs wherein the crystallization rate is inhibited, for example, the crystallization peak temperature is adjusted to within a range of from 130 to 180° C., a molded foam article of an aromatic polyester resin can be produced wherein generation of sink, that is liable to occur in the molded foam article, is also inhibited.

Another object of the present invention is to provide a process for producing a molded foam article, wherein the above fusion, sink and appearance are improved and the heat resistance is imparted by accelerating the crystallinity within a shorter time, by adding a step of heating again to a specific temperature after the step of immediately following the molding.

DISCLOSURE OF THE INVENTION

The present invention relates to a process for producing a crystalline aromatic polyester resin molded foam article, which comprises molding crystalline aromatic polyester resin prepuffs using male and female mold members of a mold assembly through the following steps (1) to (4):

step (1) of filling a mold cavity, which is formed by closing the male and female mold members, with the crystalline aromatic polyester resin prepuffs;

step (2) of heating a surface of the mold to a temperature in a range of from (Tg+35) to (Tg+57)°C. (Tg is a glass transition temperature of the crystalline aromatic polyester resin prepuffs), thereby to mold the filled prepuffs;

step (3) of cooling the surface of the mold to a temperature not lower than Tg over a period of at least 20 seconds while holding the molded foam article in the mold as it is; and step (4) of removing the molded foam article from the mold, after finally cooling the surface of the mold lower than Tg.

According to the process for the present invention, by providing step (3) of cooling the molded foam article to the temperature at which the surface temperature of the mold for cavity-molding is not lower than Tg for a period of 20 seconds or more without removing from the mold after the completion of heating for cavity-molding (expanding and fusing), a molded foam article having a sufficient fusion ratio of about 30% or more can be produced even when using prepuffs having very high crystallization rate equivalent to that of a general purpose polyester resin. The molded foam article whose fusion ratio was improved to 30% or more can satisfy the quality standard wherein the thermal dimensional change on heating at 140° C. for 24 hours is lowered to 2% or less, which has been required in applications such as industrial members and automotive members.

The present invention also relates to a process employing the step of cooling once under the above-described specific conditions, there can be produced a molded foam article having a good appearance wherein generation of sink which is liable to occur in the molded foam article is also inhibited in case of molding prepuffs wherein the crystallization rate is inhibited, for example, the crystallization peak temperature is adjusted to within a range of from 130 to 180° C.

In the process for producing a crystalline aromatic polyester resin molded foam article of the present invention, the addition of following step (3a) between steps (3) and (4) is effective:

step (3a) of heating the surface of the mold again to the temperature within a range of from (Tg+20) to (Tg+57)°C., accelerating crystallization of the molded foam.

The better process of the present invention, wherein the cooling of step (3) is conducted for a shorter time, for example from 20 to 300 seconds and the providing of the above step (3a) between the steps (3) and (4), the before described fusion is further improved and generation of sink is inhibited. At the same time, crystallization is accelerated within a shorter time, thereby making it possible to impart the heat resistance to the molded foam article having good appearance.

BEST MODE FOR CARRYING OUT THE INVENTION

Figure 1:
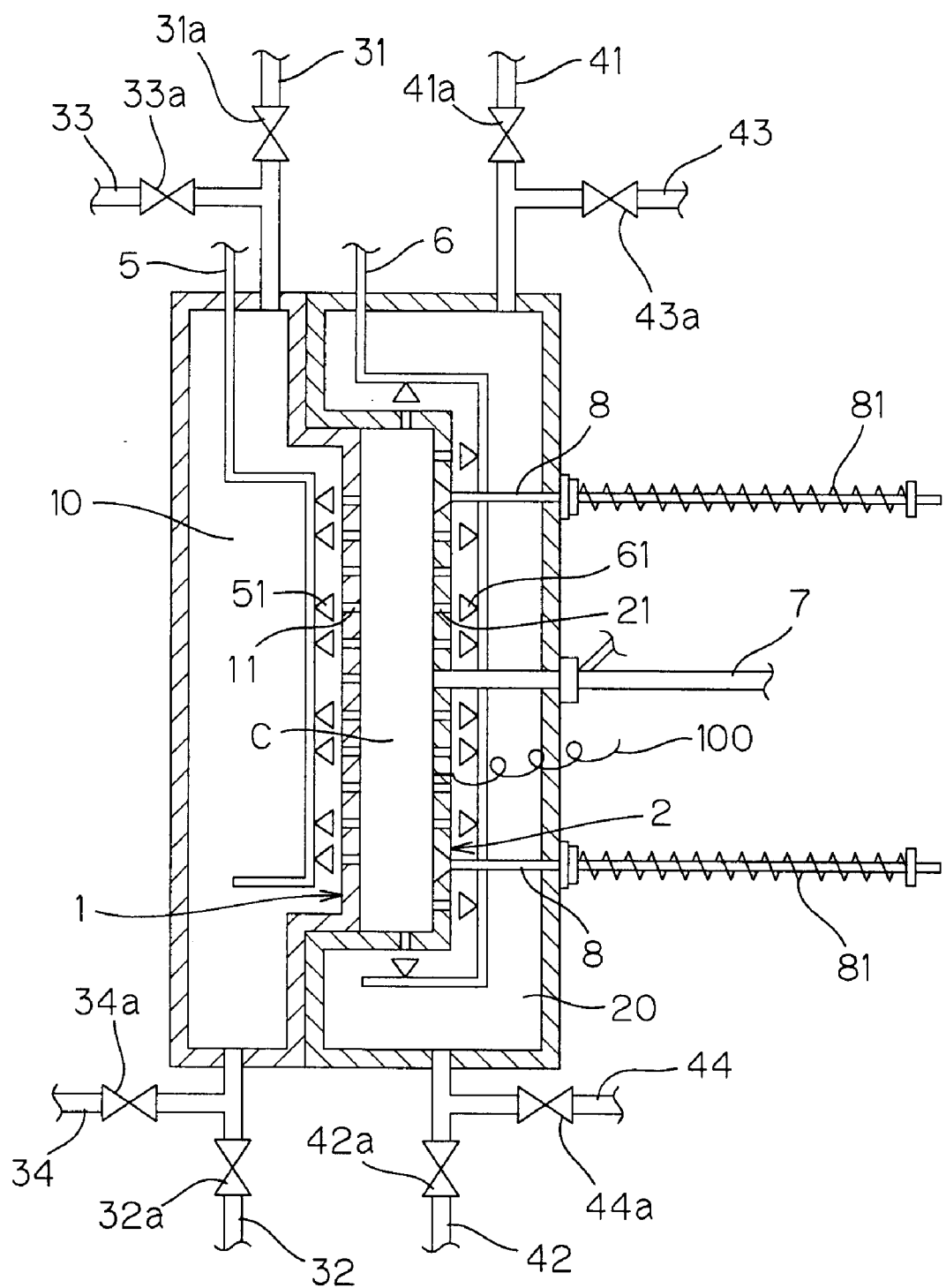
FIG. 1 is a sectional view showing one embodiment of a mold for cavity-molding used for carrying out the process for producing the molded foam article of the present invention.

The process for producing a molded foam article of the present invention will be described in detail below with reference to FIG. 1.

A mold for cavity-molding is equipped with male mold member 1 and female mold member 2 of a mold assembly, which form a mold cavity C corresponding to the shape (shape of plate in the figure) of the molded foam article when the mold is closed as shown in FIG. 1.

The male mold member 1 and female mold member 2 are respectively formed in a hollow shape equipped with spaces 10, for introducing steam therein. Each mold member has certain specific piping connect to it. Steam pipes 31, 41 are provided for supplying steam supplied from a supply source (not shown) of steam, the steam pipes being provided with steam valves 31a, 41a along the line. Drain pipes 32, 42 are provided for draining steam out of the spaces 10, 20, said drain pipes being provided with drain valves 32a, 42a along the line. Exhaust pipes 33, 43 are provided for exhausting the spaces 10, 20 on filling of a mold cavity C with prepuffs or exhausting the spaces 10, 20 for pressure control on molding, said exhaust pipes being provided with exhaust valves 33a, 43a along the line. Pressure reducing pipes 34, 44 are provided for reducing a pressure in the spaces 10, 20, said pressure reducing pipes being provided with pressure reducing valves 34a, 44a along the line.

Steam supplied into the spaces 10, 20 of the male mold member 1 and female mold member 2 through the steam pipes 31, 41 is supplied into the mold cavity C through many fine vent holes 11, 21 formed on the mold surface constituting the mold cavity C of the male mold member 1 and female mold member 2, the steam is thus used for cavity-molding the prepuffs with which the mold cavity C is filled. As a heating medium, for example, a hot air can be used, in addition to steam, but steam is most effective to mold effectively.

In the spaces 10, 20 of the male mold member 1 and female mold member 2, cooling pipes 5, 6 are provide having plural cooling water nozzles 51, 61, which are used for supplying cooling water for cooling the molded foam article after cavity-molding both by contacting the mold back surface constituting the cavity C, and by flowing into the mold cavity C through the vent holes 11, 21.

The female mold member 2 as the cavity side is provided with a filling gun 7 for supplying prepuffs into the mold cavity C and eject pins 8,8 for extruding the molded foam article after cavity-molding from the mold cavity C on opening of the male mold member 1 as the movable side. In the drawing, reference numerals 81, 81 denote springs for retaining the eject pins 8, 8 in the state shown in the figure on closing of the mold.

To carry out the process for producing the molded foam article of the present invention using the above mold for cavity-molding, a mold cavity C is filled with a predetermined amount of prepuffs of a crystalline aromatic polyester resin using the filling gun 7 with the above male mold member 1 and female mold member 2 together, steam valves 31a, 41a, drain valves 32a, 42a and pressure reducing valves 34a, 44a are closed and exhaust valves 33a, 43a are opened. This enables exhaustion of the spaces 10, 20 as well as the mold cavity C through exhaust pipes 33, 34 {step (1)}.

The exhaust valves 33a, 43a are closed and steam valves 41a and drain valve 32a are opened. Then steam under low pressure (e.g. about 0.01 to 0.05 MPa in gauge pressure) is supplied (one side heating) from the side of the female mold member 2 into the mold cavity C for a predetermined time. The steam valve 41a and drain valve 32a are closed and the steam valve 31a and drain valve 42a are opened. Then steam under the same low pressure (e.g. about 0.01 to 0.05 MPa in gauge pressure) is supplied (another side heating) from the side of the male mold member 1 into the mold cavity C for a predetermined time.

One side heating and another side heating are carried out to remove air which is present between the prepuffs with which the mold cavity C is filled. This may be optionally carried out after or with reducing of the pressure in the mold cavity C by opening the pressure reducing valves 34a, 44a. The one side heating and another side heating are pretreatments to be carried out before-heating for cavity-molding as described below.

The steam valves 31a, 41a are opened and all of the other valves are closed. Then, steam at high pressure (e.g. about 0.02 to 0.10 MPa in gauge pressure) is supplied into the mold cavity C for a predetermined time and the mold is heated so that the surface temperature of the mold portion in contact with the prepuffs are within a range of from (Tg+35) to (Tg+57)°C., thereby to expand and to fuse the prepuffs each other (cavity-molding) {step (2)}.

In this case, the exhaust valves 33a, 43a may be open or closed to adjust the pressure so that the mold surface temperature is approximately fixed.

When the mold surface temperature is lower than (Tg+35)°C., sufficient cavity-molding of the prepuffs does not occur even if steam is continuously introduced for a long time. Extension of the surface of the molded foam article becomes poor and gaps between the prepuffs increase, resulting in a poor molded foam article.

On the other hand, when the mold surface temperature on heating is higher than (Tg+57)°C., the surface of the molded foam article is liable to be molten, resulting in a poor molded foam article.

In this specification, a pore which does not pass through one of the mold members from the back surface (side of spaces 10, 20) to the molding surface is formed at the portion facing to the mold cavity C in at least one of the male mold member 1 and female mold member 2. A temperature sensor, such as a thermocouple 100, was inserted and was fixed into the pore. The measured temperature was taken as a mold surface temperature. The distance from a tip of the sensor to the actual surface of the mold is approximately 1 to 3 mm but since the mold is made of a metal having good thermal conductivity, a difference in temperature between them and a difference in time with the change of the temperature may be neglected.

To maintain a good appearance of the molded foam article, the time required for cavity-molding can be reduced when the temperature becomes higher than within the above range of from (Tg+35) to (Tg+57)°C. However, the time required for cavity-molding is prolonged when the temperature becomes lower. The heating time and heating temperature vary depending on the shape of the mold, and the thickness and density of the molded foam article, but the heating time is preferably from about 5 seconds to 3 minutes.

After the completion of heating for cavity-molding, the surface of the mold is cooled to the temperature not lower than Tg for a period of 20 seconds or more while holding the molded foam article in the mold as it is {step (3)}.

By this cooling step, a molded foam article having sufficient fusion ratio of not less than 30% can be produced even when using prepuffs of the general purpose polyester resin. The molded foam article whose fusion ratio was improved to 30% or more can satisfy the quality standard wherein the thermal dimensional change ratio on heating at 140° C. for 24 hours is lowered to 2% or less. This quality standard has been required in applications such as industrial members and automotive members.

There can be produced a molded foam article having a good appearance wherein generation of sink is also inhibited in case of cavity-molding prepuffs wherein crystallization rate is inhibited, for example, the crystallization peak temperature is adjusted to within a range of from 130 to 180° C.

In case where the time of step (3) is 20 seconds or less, that is, the mold surface temperature is rapidly cooled to Tg or less within 20 seconds, the above-described effect can not be obtained. Enough cooling time in the above step is about 900 seconds or less. Even if the cooling time is longer than 900 seconds, there can not be obtained further merits warranting prolonging a cavity-molding cycle.

The specific cooling process is preferably gentle air cooling of allowing the assembly to stand in the state where all of the above-described steam valves 31a, 41a, drain valves 32a, 42a, the exhaust valves 33a, 43a and pressure reducing valves 34, 44 are closed after the completion of the cavity-molding. During the air cooling, the mold surface temperature is slowly lowered, but the crystallization of the molded foam article can be accelerated.

For the purpose of slowing the reduction of mold surface temperature during this cooling, steam can also be introduced. The temperature of steam to be introduced is preferably set to the temperature which is 2° C. or more, particularly 4° C. or more, lower than the cavity-molding temperature. The time required for introducing steam may be appropriately set according to the shape of the mold, thickness and density of molded foam article. Steam may be introduced continuously or intermittently.

Only when the cooling step after the completion of cavity-molding is conducted for the above-described relatively long time, the crystallization of the molded foam article is sufficiently accelerated, thereby making it possible to impart the desired heat resistance.

To increase the crystallinity efficiently within a shorter time, for example, the crystallization of the resin is preferably accelerated by re-heating the assembly for 10 to 180 seconds so that the mold surface temperature is in a range of from (Tg+20) to (Tg+57)°C. after adjusting the time of the cooling step to at least 300 seconds {step (3a)}.

Since the crystallinity of the molded foam article is improved in the above step (3), it is possible to inhibit the surface from melting by re-heating using a temperature within the temperature range of the step (3a). When the re-heating time is less than 10 seconds, the effect of accelerating the crystallization becomes poor. When the re-heating time does not exceed 180 seconds, a reduction in cavity-molding cycle time is remarkable.

The conditions of re-heating are set according to the density or thickness of the molded foam article, but the above temperature range causing no melting on the surface of the molded foam article is preferred. That is, the conditions wherein the mold surface temperature does not exceed (Tg+57)°C. are preferred. When the mold surface temperature exceeds this temperature, the surface of the molded foam article is liable to be molten, which is not preferred. The crystallization is preferably accelerated under homeothermal conditions.

When the mold surface temperature on re-heating is less than (Tg+20)°C., the crystallization rate is late and is not put to practical use.

After the completion of the cavity-molding, cooled under predetermined conditions and re-heated if necessary, the mold surface temperature is finally cooled to Tg or less by water cooling by the supply of cooling water through cooling water nozzles 51, 61 of the cooling pipes 5,6. After removing the molded foam article from the mold, an excellent molded foam article can be produced.

As the prepuffs of the crystalline aromatic polyester resin used in the process for the present invention, especially, those having a crystallization peak temperature of 130 to 180° C. are preferably used, in addition to a general purpose PET resin.

Since the crystallization peak temperature means the temperature at which the crystallinity becomes maximum by heating, the higher the peak temperature, the lower the crystallization rate. Prepuffs made of the general purpose PET have a crystallization peak temperature of not more than 130° C. and have a very fast crystallization rate. On the other hand, prepuffs having a crystallization peak temperature of not less than 130° C. have a late crystallization rate than that of the prepuffs made of the general purpose PET, thereby making it possible to limit the crystallinity within lower range than before and to inhibit the crystallization from proceeding in the cavity-molding step. Therefore, the fusion between the prepuffs on cavity-molding is further improved to set the thermal dimensional change on heating at 140° C. for 24 hours to be lowered to 2.0% or less, thereby making it possible to produce a molded foam article having excellent appearance and mechanical strength.

Prepuffs having a crystallization peak temperature of higher than 180° C. can not impart the desired heat resistance to the molded foam article because its crystallization rate is too late and the article hardly crystallizes. In addition, the range of the cavity-molding conditions becomes narrow, thereby making it difficult to conduct cavity-molding. Alternatively, since an increase in the crystallinity is excessively low, the molded foam article can not stand against a heating medium such as steam and shrinkage of the surface occurs. Therefore, a molded foam article having good appearance is not obtained.

The crystallization peak temperature was measured by using a differential scanning calorimetry (DSC) in accordance with the measuring procedure defined in the Japanese Industrial Standard No. JIS K7121$_{-1987}$ "Testing Method for Transition Temperatures of Plastics".

Specifically, a predetermined amount of prepuffs is set in a measuring container of DSC and heated to 280° C. at a heating rate of 10° C./min and, after maintaining at the same temperature (280° C.) for 10 minutes, the sample is left to cooled to room temperature (23° C.). Thereafter, the crystallization peak temperature is measured by heating the sample again at a heating rate of 10° C./min.

In order to control the crystallization peak temperature of the prepuffs within the above range, the crystalline aromatic polyester resin constituting the prepuff should be modified by changing the element of dicarboxylic acid and/or diol.

Specifically, isophthalic acid represented by the formula (1):

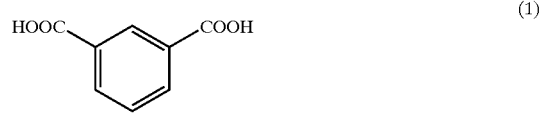

can be used as dicarboxylic acid, or 1,4-cyclohexanedimethanol represented by the formula (2):

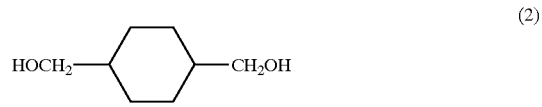

can be used as diol, which may be used either singly or combination. The total content of a unit derived from isophthalic acid (hereinafter referred as IPA unit) and/or a unit derived from 1,4-cyclohexanedimethanol (hereinafter referred as CHDM unit) in the crystalline aromatic polyester resin should be within a range of from 0.5 to 10% by weight.

To markedly improve the fusion between the prepuffs, the content of the IPA unit and/or CHDM unit should be preferably from about 0.6 to 9.0% by weight, and more preferably from about 0.7 to 0.8% by weight.

Among other components constituting the crystalline aromatic polyester resin of the present invention, can include as dicarboxylic acid for example, terephthalic acid and phthalic acid, in addition to isophthalic acid and 1,4-cyclohexanedimethanol.

The diol component of the present invention can include, for example, ethylene glycol, α-butylene glycol (1,2-butanediol), β-butylene glycol (1,3-butanediol), tetramethylene glycol (1,4-butanediol), 2,3-butylene glycol (2,3-butanediol), neopentyl glycol or the like.

The material for crystalline aromatic polyester resin may contain a small amount of a polyhydric (tri- or polyhydric) carboxylic acid or an anhydride thereof as an acid component (e.g. tricarboxylic acid such as trimellitic acid, tetracarboxylic acid such as pyromellitic acid, etc.) and a polyhydric (tri- or polyhydric) alcohol as an alcohol component (e.g. triol such as glycerin, tetraol such as pentaerythritol, etc.), in addition to the respective components described above, in such manner that the crystallization peak temperature of the crystalline aromatic polyester resin does not deviate from the range of from 130 to 180° C.

The crystalline aromatic polyester resin used in the present invention is produced by the polycondensation reaction, in such manner that the total content of the IPA unit and/or CHDM unit is within a range of from 0.5 to 10% by weight of the crystalline aromatic polyester resin.

In the present invention, the following additives can be added to the crystalline aromatic polyester resin.

The additive can include, for example, flame retardants, antistatic agents, pigments, expansion nucleating agents, melt tension modifiers, antioxidants, etc., in addition to blowing agents.

As the blowing agent, any of chemical and physical blowing agents can be used.

The chemical blowing agent, which is decomposed at the temperature higher than the softening point of the crystalline aromatic polyester resin, can include azodicarbonamide, dinitropentamethylenetetramine, hydrazoldicarbonamide, sodium bicarbonate or the like.

The physical blowing agent can include, for example, saturated hydrocarbon such as propane, n-butane, isobutane, n-pentane, isopentane, cycropentane, hexane, etc.; halogenated hydrocarbon such as methyl chloride, Freon®, etc.; and an ether compound such as dimethyl ether, methyl-tert-butyl ether, etc.

Furthermore, an inorganic gas such as carbon dioxide, nitrogen or the like can be used as the blowing agent.

As an expansion nucleating agent, for example, a polytetrafluoroethylene resin is preferred.

In the present invention, there can be added polyolefin resin such as polypropylene resin, thermoplastic elastomer resin such as polyester elastomer resin, polycarbonate resin, ionomer resin or the like to the crystalline aromatic polyester resin as far as a large influence is not exerted on the crystallinity or crystallization rate.

As an melt tension modifier, for example, epoxy compound such as glycidyl phthalate, acid anhydride such as pyromellitic dianhydride, and metal compound of the group Ia and IIa such as sodium carbonate can be used alone or in combination.

The prepuffs are produced by extrusion foaming the crystalline aromatic polyester resin and cutting the resulting foamed extrudate (foam) into particles.

As described above, the step of impregnating the crystalline aromatic polyester resin with the blowing agent is eliminated thereby to save the time, cost and labor and, at the same time, the crystallinity of the prepuffs is further lowered, thereby making it possible to improve the fusion between the prepuffs on cavity-molding.

The size of the prepuffs thus produced is preferably from about 0.5 to 5 mm in an average particle diameter.

The crystallinity (%) was determined from a quantity of heat of cold crystallization and a quantity of heat of fusion, that were measured in accordance with the measuring procedure defined in the Japanese Industrial Standard No. JIS K7121$_{-1987}$ using a differential scanning calorimetry (DSC) in the same manner as in measurement of the crystallization peak temperature described previously, by the following equation:

$$\text{Crystallinity (\%)} = \frac{\text{(Quality of heat of fusion per mol)} - \text{(Quantity of heat of cold crystallizsation per mol)}}{\text{(Quantity of heat of fusion per mol of perfect crystallized PET resin)}} \times 100$$

The quantity of heat of fusion per mol of the perfect crystallized PET resin in the equation was set to 26.9 kJ due to the description of Polymer Data Handbook (issued by Baifukan).

Specifically, a predetermined amount of the prepuffs as a sample measured was set in a measuring container of DSC and the quantity of heat of cold crystallization and quantity of heat of fusion were measured with heating at a heating rate of 10° C./min. The crystallinity of the prepuffs was determined from the measurement results on the basis of the above equation.

In the present invention, the bulk density of the prepuffs are controlled within a range of from 0.01 to 1.0 g/cm$^3$ so as to obtain a molded foam article which is lightweight and is superior in mechanical strength, heat resistance, insulating properties, cushioning properties and chemical resistance.

The bulk density of the prepuffs are preferably from about 0.03 to 0.8 g/cm$^3$, and more preferably from about 0.04 to 0.6 g/cm$^3$, within the above range.

To produce a further lightweight molded foam article, the bulk density of the prepuffs are particularly preferably not more than 0.1 g/cm$^3$, within the range of from 0.01 to 1.0 g/cm$^3$.

In case where prepuffs having a comparatively low bulk density of not more than 0.1 g/cm$^2$ are produced, there should be used a process for impregnating the prepuffs produced by the previously described process with a gas under pressure and subjecting the impregnated prepuffs to the step of re-expanding by heating, thereby to control the bulk density to a lower value. The re-expanding step may be repeated twice or more.

In the re-expanding step, the gas with which the prepuffs are impregnated can include nitrogen, air, carbon dioxide gas, helium, methane, ethane, propane, butane or the like.

Among them, an inorganic gas is preferred and an air is particularly preferred. Among the inorganic gases, an air containing a large amount of nitrogen is advantageous in that it is not rapidly dissipated like carbon dioxide gas when the prepuffs are re-expanded. Re-expanding can be sufficiently conducted at low temperature within a short time under the conditions of a heating temperature of 55 to 90° C. and a heating time of 12 minutes or less, that have never been considered. Therefore, a rise in the crystallinity of the prepuffs are inhibited, thereby making it possible to improve the foaming and fusion on cavity-molding and to improve the mechanical strength.

In the vapor phase impregnation for impregnating the prepuffs with the above gas, the impregnation pressure is preferably from about 0.1 to 5 MPa, and particularly from about 0.2 to 2 MPa, in gauge pressure. The impregnation time is preferably from about 1 to 24 hours, and particularly from about 1 to 12 hours. The temperature is preferably Tg or less.

In case where the prepuffs impregnated with the gas are re-expanded, for example, hot air, hot water, steam, hot oil, hot gas, etc. can be used as a heating medium. In view of good handling of the prepuffs after re-expanding and efficiency of re-expanding, hot air or steam is preferred.

The re-expanding step is suited for production of prepuffs having a bulk density of not more than 0.1 g/cm$^3$ (referred to as "secondary prepuffs"). Accordingly, even in case where the bulk density of the prepuffs before re-expanding (referred to as "primary prepuffs") is higher than 0.1 g/cm$^3$, the bulk density can be controlled lower by carrying out the re-expanding step.

The prepuffs may be in the shape of a general cylinder, square or chip. Among them, a generally cylindrical shape is particularly preferred. This reason is as follows. That is, in case of cavity-molding, the mold cavity formed by closing the mold for cavity-molding equipped with male and female mold members of the mold assembly previously described can be filled with the prepuffs more evenness. The molded foam article produced the prepuffs can exhibit excellent mechanical strength.

An open cell ratio of the prepuffs (primary prepuffs/ secondary prepuffs) is preferably from 5 to 35%.

When the open cell ratio of the prepuffs exceeds 35%, a harmful influence is exerted on cavity-molding, sometimes, and there is a fear that good molded foam article can not be produced.

On the other hand, when the open cell ratio is not more than 5%, there is a fear that shrinkage of a molded foam article on removal from the mold increased. To the contrary, when using the prepuffs having an open cell ratio within a range of from 5 to 35%, shrinkage on removal from the mold can be inhibited and the appearance does not become poor due to generation of wrinkles on the surface of the molded foam article. Accordingly, this open cell ratio is particularly suited for use as industrial parts to which high dimensional accuracy is required.

The prepuffs impregnated previously with inorganic gases such as air, carbon dioxide gas, nitrogen, helium and the like can increase an expansion force on cavity-molding, and a good molded foam article can be obtained.

Among these inorganic gases, air containing a large amount of nitrogen is particularly preferred. The pressure on impregnating with the inorganic gas is preferably from 0.01 to 5 MPa at gauge pressure, and more preferably from 0.02 to 2 MPa at gauge pressure.

Regarding the molded foam article produced by the process for the present invention, the molded foam article having a sufficient fusion ratio of about not less than 30% can be obtained from prepuffs using a general purpose polyester resin. Since the crystallinity of the molded foam article can be improved to 20% or more, the molded foam article can satisfy the quality wherein the thermal dimensional change ratio on heating at 140° C. for 24 hours is lowered to 2% or less, which has been required in applications such as industrial members and automotive members. When using prepuffs wherein crystallization rate of the polyester resin was inhibited, for example, the crystallization peak temperature was adjusted within a range of from 130 to 180° C., the fusion ratio can be improved to 40% or more, and to 60% or more. In case of those wherein the crystallinity of the molded foam article was increased to 20% or more by the relatively long cooling time due to the step (3) or re-heating due to the step (3a), the above thermal dimensional change ratio can be improved to 2% or less, and to 1% or less.

In the molded foam article using prepuffs whose crystallization rate was inhibited, there can be produced a molded foam article having good appearance wherein generation of sink which is liable to occur in the molded foam article is also inhibited even in case where the crystallinity is not increased to 20% or more as described above.

Accordingly, a molded foam article of a crystalline aromatic polyester resin, which is superior in appearance and mechanical strength such as bending strength, can be produced by using prepuffs made of a general purpose polyester resins or prepuffs whose crystallization rate was inhibited.

The molded foam article can be reused after being used in various applications. By reusing the used molded foam article, it is made possible to contribute to effective reuse of resources and reduction in dust and to reduce the cost of the molded foam article.

As described above in detail, according to the present invention, there is exerted such specific operation/working-effect that a good molded foam article, which has excellent appearance, improved fusion between the prepuffs and excellent mechanical strength, can be produced in an easy and efficient manner.

EXAMPLES

Advantages of the present invention will be described in detail by the following Examples and Comparative Examples.

Any of the following measurements was conducted under an measuring environment of a temperature of 23° C.±2° C. and a humidity of 50±5%RH in accordance with the Japanese Industrial Standard No. JIS K7100$_{-1981}$ "Standard Atmospheres for Conditioning and Testing of Plastics".

The crystallization peak temperature of the prepuffs, and the crystallinity of the prepuffs, molded foam article and the like were determined from the results measured in accordance with the measuring procedure defined in the Japanese Industrial Standard No. JIS K7121$_{-1987}$, as described above.

The content of the IPA unit and/or CHDM unit in the crystalline aromatic polyester resin, and the melt tension of the resin were measured by the following procedures, respectively. Measurement of content of IPA unit.

After weighing about 100 mg of a sample in a pressure-resistant teflon cup, 10 ml of dimethyl sulfoxide for absorption spectrochemical analysis manufactured by Wako Pure Chemical Industries, Ltd. and 6 ml of a 5 N sodium hydroxide-methanol solution were added. Then, the pressure-resistant teflon cup was put in a pressure-resistant heating cup made of SUS and, after securely sealing the cup, heating was conducted at 100° C. for 15 hours.

Then the pressure-resistant heating cup after heating was cooled to room temperature, the pressure-resistant teflon cup that completely cooled was removed and the contents in the cup were transferred to a 200 ml beaker. Distilled water was added in the amount of up to about 150 ml.

After confirming that the contents had been completely dissolved, the solution was neutralized with hydrochloric acid within a range of from pH 6.5 to 7.5. After the completion of the neutralization, the solution was diluted to 200 ml with distilled water and then the diluted solution was further diluted ten times with distilled water and the resulting solution was taken as a sample solution.

Using this sample solution and an isophthalic acid standard solution, the measurement was conducted under the following conditions by a high-performance liquid chromatograph (HPLC) apparatus. As the isophthalic acid standard solution, those prepared by dissolving an isophthalic acid reagent manufactured by Tokyo Kasei Kogyo Co., Ltd. with distilled water were used.

Instrument: Waters HPLC LC-module 1

Column: Inertsil ODS-2 manufactured by GL Co., 5 $\mu$m (4.6×250)

Column temperature: 23±2° C.

Pump temperature: 23±2° C.

Eluent: 0.1% phosphoric acid/acetonitrile=80/20

Flow rate: 0.5 ml/min.

Run time: 50 minutes

Amount to be poured: 50 $\mu$l

Detection: UV-210 nm

Then, a calibration curve was made by a plot of the peak area of isophthalic acid obtained from the standard solution as X-axis versus the concentration as Y-axis. Using the resulting calibration curve, the concentration of isophthalic acid ($\mu$g/ml) in the sample solution was calculated.

The content of the IPA unit (% by weight) in the crystalline aromatic polyester resin was calculated from the above concentration by using the following equation:

$$\text{Content of IPA unit (\% by weight)} = \frac{\{\text{Concentration of isophthalic acid }(\mu g/ml)\}}{\{\text{Weight of sample (mg)}\}} \times 159.05$$

Measurement of content of CHDM Unit

After weighing about 100 mg of a sample in a pressure-resistant teflon cup, 10 ml of dimethyl sulfoxide for absorption spectrochemical analysis manufactured by Wako Pure Chemical Industries, Ltd. and 6 ml of a 5 N sodium hydroxide-methanol solution were added. Then, the pressure-resistant teflon cup was put in a pressure-resistant heating cup made of SUS and, after securely sealing the cup, heating was conducted at 100° C. for 15 hours.

Then the pressure-resistant heating cup after heating was cooled to room temperature, the pressure-resistant teflon cup that completely cooled was removed and the contents in the cup were transferred to a 100 ml beaker. Guaranteed reagent methanol was added in the amount of up to about 70 ml.

After confirming that the contents had been completely dissolved, the solution was neutralized with hydrochloric acid within a range of from pH 6.5 to 7.5. After the completion of the neutralization, the solution was diluted to 100 ml with guaranteed reagent acetone and then the diluted solution was further diluted ten times with guaranteed reagent acetone and the resulting solution was taken as a sample solution.

This sample solution and a 1,4-cyclohexanedimethanol standard solution were weighed separately in a 10 ml centrifuge tube. After the solvent was evaporated to dryness with centrifuging, 0.2 ml of a TMS agent manufactured by Tokyo Kasei Kogyo Co, Ltd. was added and heating was conducted at 60° C. for 1 hour.

Using a gas chromatograph (GC) apparatus, the liquid after heating was measured under the following conditions.

Instrument: Perkin Elmer GC AutoSystem

Column: DB-5 (0.25 mm$\phi$×30 m×0.25 $\mu$m)

Oven temperature: 100° C. (2 minutes) R1–200° C.–R2–320° C. (5 minutes)

Heating rate: R1=10° C./min., R2=40° C./min.

Run time: 20 minutes

Injection temperature: 300° C.

Detector: FID (300° C.)

Gas pressure: 18 psi

Then, a calibration curve was made by a plot of the peak area of 1,4-cyclohexanedimethanol obtained from the standard solution as X-axis versus the concentration as Y-axis. Using the resulting calibration curve, the concentration of 1,4-cyclohexanedimethanol ($\mu$g/ml) in the sample solution was calculated.

The content of the CHDM unit (% by weight) in the crystalline aromatic polyester resin was calculated from the above concentration by using the following equation:

$$\text{Content of CHDM unit (\% by weight)} = \frac{\{\text{Concentration of 1,4-cyclohexanedimethanol }(\mu g/ml)\}}{\{\text{Weight of sample (mg)}\}} \times 98.62$$

The bulk density of the prepuffs and the apparent density of the molded foam article were measured by the following procedures.

Measurement of Bulk Density and Apparent Density

In accordance with the procedure defined in the Japanese Industrial Standard No. JIS K6767$_{-1976}$ "Testing Method for Polyethylene Foams", the bulk density of the prepuffs (g/cm$^3$) and the apparent density of the molded foam article (g/cm$^3$) were determined by using the following equations respectively.

$$\text{Bulk density of prepuffs (g/cm}^3\text{)} = \frac{\{\text{Weight of prepuffs (g)}\}}{\{\text{Bulk volume of prepuffs (cm}^3\text{)}\}}$$

$$\text{Apparent density of molded foam article (g/cm}^3\text{)} = \frac{\{\text{Weight of molded foam article (g)}\}}{\{\text{Volume of molded foam article (cm}^3\text{)}\}}$$

The open cell ratio of the prepuffs was measured by the following procedures.

Measurement of Open Cell Ratio

The open cell ratio (%) of the prepuffs was determined by conducting the following tests (1) to (3).

(1) Measurement of weight and volume of prepuffs

The weight of prepuffs which can be charged in a sample cup of an air comparison type specific gravimeter (Model 1000, manufactured by Tokyo Science Co.) in the volume of about 80% was previously measured {weight A of prepuffs (g)}. The prepuffs were charged in the cup and the cup was set to the specific gravimeter, and then the volume was measured by the 1-1/2-1 atmosphere method {volume B of prepuffs (g/cm$^3$)}.

(2) Measurement of apparent volume of prepuffs

In the state where a measuring dish of an electronical balance (HB3000, manufactured by YAMATO SCALE Co., Ltd.) was removed and a container made of a wire gauze was suspended by a fitting, the above container was dipped in water and the weight of the container was measured in water {weight C of container in water (g)}.

Then, the total amount of the prepuffs measured in the above item (1) was charged in the same container and the total weight of the container and prepuffs was measured in the state of being dipped in water in the same manner as described above {total weight D in water (g)}.

Then, the apparent volume E of the prepuffs (g/cm$^3$) was determined by the following equation:

$$E = A + (C-D)$$

With the proviso that 1 g of water was reduced to the volume of 1 cm$^3$.

(3) Open cell ratio

The open cell ratio (%) was determined from the results of the above items (1) and (2) by the following equation:

$$\text{Open cell ratio (\%)} = (E-B) \times 100/E$$

The fusion ratio of the molded foam article was measured by the following procedures and, at the same time, the dimensional stability and appearance were evaluated by the following procedures.

Measurement of Fusion Ratio

After the molded foam article was fractured by folding in the thickness direction, the number of all prepuffs existing on the fractured surface and that of prepuffs wherein material fracture occurred were counted. Then, its fusion ratio (%) as an indication of the fusion between the prepuffs was determined by the following equation:

$$\text{Fusion ratio (\%)} = \frac{\text{(Number of prepuffs wherein material fracture occurred)}}{\text{(Number of all prepuffs existing on fractures surface)}} \times 100$$

Evaluation of Dimensional Stability of Molded Foam Article

The shrinkage ratio of the molded foam article (%) on removal from the molds was determined from the distance $L_1$ corresponding to the maximum length of the molded foam article of the molding cavity and the maximum length $L_2$ of the molded foam article on removal from the molds by the following equation. The sample where the shrinkage ratio was not more than 2% was rated "○" (good dimensional stability), while the sample where the shrinkage ratio was exceeded 2% was rated "X" (poor dimensional stability).

$$\text{Shrinkage ratio of molded foam article (\%)} = (L_1-L_2) \times 100/L_1$$

Evaluation of Surface Finish of Molded Foam Article

The surface finish of the molded foam article was visually observed and then the sample where melting, poor particle extension were recognized was rated "X" (poor surface finish), while the sample where these were not recognized was rated "○" (good surface finish).

Measurement of Bending Strength

Using test pieces in size of 50 mm×100 mm×13 mm made by cutting the molded foam article, the bending test was conducted under the following conditions and the maximum bending strength (MPa) was determined.

Apparatus: Tensilon universal testing machine

Bending rate: 50 mm/min.

Tip dig: Pressure wedge 3.2 R

Support base: 3.2 R

Span distance: 50 mm

Evaluation of Heat Resistance

The heat resistance of the molded foam article was evaluated in accordance with the Japanese Industrial Standard No. JIS K6767$_{-1976}$. That is, the molded foam article was put in a high-temperature bath at 140° C. and heated for 24 hours. The thermal dimensional change ratio (%) was determined from an absolute value of a difference between the size $L_3$ before heating and the size $L_4$ after heating by the following equation. Then, the sample where the thermal dimensional change ratio was not more than 2% was rated "○" (good heat resistance), while the sample where the dimensional change ratio was exceeded 2% was rated "X" (poor heat resistance).

$$\text{Thermal dimensional change ratio (\%)} = |L_3-L_4| \times 100/L_3$$

Evaluation of Sink of Molded Foam Article

A board-like molded foam article in size of about 300× 400×20 mm was molded from prepuffs. The maximum dimension $T_1$ and the minimum dimension $T_2$ in the direction of thickness of the molded foam article immediately after taken out from the mold were measured. The sink (%) was determined from the following equation:

$$\text{Sink(\%)} = |T_1-T_2| \times 100/T_1$$

The sample where the sink was not more than 5% was rated "○" (without sink), while the sink was exceeded 5% was rated "X" (with sink).

EXAMPLE 1

100 parts by weight of a crystalline aromatic polyester resin(Tg: 68° C.) synthesized by polycondensation reaction of ethyleneglycol and terephthalic acid, 0.30 parts by weight of pyromellitic dianhydride as a modifier, and 0.03 parts by weight of sodium carbonate as an auxiliary modifier were charged in an extruder (extruder bore: 65 mm, L/D ratio: 35) and mixed and melted at a screw revolution 50 rpm and a barrel temperature in the range of from of 270 to 290° C. Then 1.0 parts by weight relative to the mixture of butane (n-butane/isobutane=7/3) as ablowing agent was injected into the extruder barrel.

Then, the mixture in the molten state was extruded and foamed through each nozzles of a multi nozzle die (15 nozzles having a diameter of 0.8 mm are disposed on a line) connected to the tip portion of the extruder barrel, and then cooled in a cooling water bath.

The cooled strand-like foam (foamed extrudate) was sufficiently dehydrated and then cut into generally cylindrical pieces using a pelletizer to produce prepuffs.

The bulk density of the prepuffs was 0.13 g/cm$^3$, the particle diameter was from 1.4 to 2.5 mm, the crystallinity was 9.0%, the crystallization peak temperature was 126.0° C.

A mold cavity having an inner size of 300 mm×400 mm×20 mm, which was formed by closing male and female mold members, was filled with the prepuffs. Then steam valve of the female mold member was opened while drain valve of the male mold member was opened to introduce steam into the mold cavity at gauge pressure of 0.02 MPa for 15 seconds from the female mold member, after which steam valve of the male mold member was opened while drain valve of the female mold member was opened to introduce steam into the mold cavity at gauge pressure of 0.02 MPa for 15 seconds from the male mold member, thus air in the mold cavity was removed.

Then, the steam valves of both the male and female mold members were opened while the drain valves were closed to mold (expand and fuse) prepuffs by introducing steam into the mold cavity at gauge pressure of 0.07 MPa for 15 seconds. The surface temperature of the mold at this time was 116° C.

Then the steam valves and drain valves were all closed to cool the molded foam article naturally in the mold cavity for 120 seconds. When that cooling was terminated, the surface temperature of the mold was 101° C.

Then, the molded foam article was cooled finally by filling water from cooling water nozzles of both the male and female mold members. Upon confirming that the surface temperature of the mold was decreased to 50° C., the mold was opened to take out the molded foam article.

It was confirmed that the apparent density of the resulting molded foam article was 0.13 g/cm$^3$ and the crystallinity was 30%. No sink was found. Its fusion ratio was 35% showing enough fusion to be normally used and the surface finish was also good. Its shrinkage ratio of the molded foam article was 0.6% and thus the dimensional stability was good. Its thermal dimensional change ratio was 0.92% and good heat resistance was exhibited. Its bending strength was 0.72 MPa.

EXAMPLE 2

In the same manner as in Example 1, except that the gauge pressure of the steam to be introduced into the mold cavity on cavity-molding was set at 0.1 MPa, a molded foam article was obtained. The surface temperature of the mold on cavity-molding was 122° C. and the surface temperature thereof was 105° C. at the time when the natural-cooling was terminated.

It was confirmed that the apparent density of the resulting molded foam article was 0.13 g/cm$^3$ and the crystallinity was 31%. No sink was found. Its fusion ratio was 35% showing enough fusion to be normally used and the surface finish was also good. Its shrinkage ratio of the molded foam article was 0.6% and thus the dimensional stability was good. Its thermal dimensional change ratio was 0.90% and good heat resistance was exhibited. Its bending strength was 0.70 MPa.

EXAMPLE 3

In the same manner as in Example 1, except that 100 parts by weight of a crystalline aromatic polyester resin(IPA Unit: 1.4 parts by weight (%), Tg: 68.9° C.) synthesized by polycondensation reaction of ethylene glycol, isophthalic acid and terephthalic acid was used, prepuffs were produced.

The bulk density of the prepuffs was 0.12 g/cm$^3$, the particle diameter was 1.4 to 2.5 mm, the crystallinity was 3.6% and the crystallization peak temperature was 135.0° C.

In the same manner as in Example 1, except that the cavity-molding period was set for 50 seconds, the above produced prepuffs was used to obtain a molded foam article.

It was confirmed that the apparent density of the resulting molded foam article was 0.11 g/cm$^3$ and the crystallinity was 24%. No sink was found. Its fusion ratio was 85% showing excellent fusion and the surface finish was also good. Its shrinkage ratio of the molded foam article was 0.8% and thus the dimensional stability was good. Its thermal dimensional change ratio was 0.53% and good heat resistance was exhibited. Its bending strength was 1.34 MPa.

EXAMPLE 4

In the same manner as in Example 3, except that the gauge pressure of the steam on cavity-molding was set at 0.1 MPa and the cavity-molding period was set for 15 seconds, a molded foam article was obtained. The surface temperature of the mold on cavity-molding was 122° C. and the surface temperature thereof was 106° C. at the time when the natural-cooling was terminated.

It was confirmed that the apparent density of the resulting molded foam article was 0.11 g/cm$^3$ and the crystallinity was 25%. No sink was found. Its fusion ratio was 85% showing excellent fusion and the surface finish was also good. Its shrinkage ratio of the molded foam article was 1.0% and thus the dimensional stability was good. Its thermal dimensional change ratio was 0.51% and good heat resistance was exhibited. Its bending strength was 1.33 MPa.

EXAMPLE 5

In the same manner as in Example 3, except that the gauge pressure of the steam on cavity-molding was set at 0.07 MPa, the cavity-molding period was set for 15 seconds, and the period for cooling the mold naturally after cavity-molding was set for 600 seconds, a molded foam article was obtained. The surface temperature of the mold on cavity-molding was 116° C. and the surface temperature thereof was 80° C. at the time when the natural-cooling was terminated.

It was confirmed that the apparent density of the resulting molded foam article was 0.11 g/cm$^3$ and the crystallinity was 28%. No sink was found. Its fusion ratio was 85% showing excellent fusion and the surface finish was also good. Its shrinkage ratio of the molded foam article was 0.5% and thus the dimensional stability was good. Its thermal dimensional change ratio was 0.49% and good heat resistance was exhibited. Its bending strength was 1.34 MPa.

EXAMPLE 6

In the same manner as in Example 5, except that the gauge pressure of the steam on cavity-molding was set at 0.02 MPa and the cavity-molding period was set for 50 seconds, a molded foam article was obtained. The surface temperature of the mold on cavity-molding was 106° C. and the surface temperature thereof was 75° C. at the time when the natural-cooling was terminated.

It was confirmed that the apparent density of the resulting molded foam article was 0.11 g/cm$^3$ and the crystallinity was 24%. No sink was found. Its fusion ratio was 80% showing excellent fusion and the surface finish was also good. Its shrinkage ratio of the molded foam article was 0.6% and thus the dimensional stability was good. Its thermal dimensional change ratio was 0.54% and good heat resistance was exhibited. Its bending strength was 1.32 MPa.

EXAMPLE 7

In the same manner as in Example 1, except that the mixture obtained by mixing the following first and second resins in a weight ratio of 75:25, melting, kneading and ester-interexchanging (IPA unit: 2.5% by weight) were used as the crystalline aromatic polyester resin, prepuffs were produced.

The first resin: synthesized by polycondensation reaction of ethylene glycol, isophthalic acid and terephthalic acid (IPA unit: 1.4% by weight, Tg: 68.9° C.)

The second resin: synthesized by polycondensation reaction of ethylene glycol, isophthalic acid and terephthalic acid (IPA unit: 5.8% by weight, Tg: 70.0° C.)

The bulk density of the prepuffs was 0.12 g/cm$^3$, the particle diameter was from 1.4 to 2.5 mm, the crystallinity was 4.0% and the crystallization peak temperature was 138.9° C.

In the same manner as in Example 1, except that the gauge pressure of the steam on cavity-molding was set at 0.07 MPa at gauge pressure and the cavity-molding period was set for 15 seconds, the above produced prepuffs was used to obtain a molded foam article.

It was confirmed that the apparent density of the resulting molded foam article was 0.11 g/cm³ and the crystallinity was 23%. No sink was found. Its fusion ratio was 90% showing excellent fusion and the surface finish was also good. Its shrinkage ratio of the molded foam article was 0.8% and thus the dimensional stability was good. Its thermal dimensional change ratio was 0.54% and good heat resistance was exhibited. Its bending strength was 1.32 MPa.

Comparative Example 1

In the same manner as in Example 1, except that the mold was not naturally cooled after cavity-molding, a molded foam article was obtained.

The apparent density of its resulting molded foam article was 0.13 g/cm³, the crystallinity was 18%, and the amount of sink was small as 1.0%; however, its fusion ratio was low as 15% showing poor fusion. The surface finish was good. Its shrinkage ratio of the molded foam article was 0.6%. Its thermal dimensional change ratio was large as 5.1% and thus heat resistance was poor. Its bending strength was 0.49 MPa.

Comparative Example 2

In the same manner as in Comparative Example 1, except that the gauge pressure of the steam on cavity-molding was set at 0.1 MPa and the cavity-molding period was set for 120 seconds, a molded foam article was obtained.

The apparent density of the resulting molded foam article was 0.13 g/cm³, the crystallinity was 27%, and no sink was found; however, its fusion ratio was low as 20% showing poor fusion. The surface finish was good. Its shrinkage ratio of the molded foam article was 0.6%. Its thermal dimensional change ratio was large as 2.5% and thus heat resistance was poor. Its bending strength was 0.52 MPa.

Comparative Example 3

In the same manner as in Example 3, except that the gauge pressure of the steam on cavity-molding was set at 0.12 MPa, the cavity-molding period was set for 15 seconds, and the period for cooling naturally the mold after cavity-molding was set for 60 seconds, a molded foam article was obtained. The surface temperature of the mold on cavity-molding was 128° C. and the surface temperature thereof was 115° C. at the time when the natural-cooling was terminated.

The apparent density of the resulting molded foam article was 0.11 g/cm³, the crystallinity was 27%, and no sink was found. Its fusion ratio was 75%. However, the surface finish was poor with unevenness because of melt by heat. Its shrinkage ratio of the molded foam article was large as 2.6% and thus the dimensional stability was poor. Its thermal dimensional change ratio was small as 0.52%. Its bending strength was 0.52 MPa.

Comparative Example 4

In the same manner as in Example 3, except that the gauge pressure of the steam on cavity-molding was set at 0.005 MPa, the cavity-molding period was set for 50 seconds, and the period for cooling naturally the mold after cavity-molding was set for 600 seconds, a molded foam article was obtained. The surface temperature of the mold on cavity-molding was 100° C. and the surface temperature thereof was 64° C. at the time when the cooling was terminated.

The apparent density of the resulting molded foam article was 0.11 g/cm³, the crystallinity was 18%, the amount of sink was small as 1.0% and its fusion ratio was 60%. However, the surface finish was poor with unevenness due to shortage of heat. Its shrinkage ratio of the molded foam article was 1.2%. Its thermal dimensional change ratio was large as 3.1% and thus the heat resistance was poor. Its bending strength was 1.22 MPa.

Comparative Example 5

In the same manner as in Example 3, except that the gauge pressure of the steam on cavity-molding was set at 0.07 MPa, the cavity-molding period was set for 15 seconds, and the surface temperature of the mold was cooled down to 65° C. by 15 seconds after cavity-molding, a molded foam article was obtained. The surface temperature of the mold on cavity-molding was 116° C.

The apparent density of the resulting molded foam article was 0.11 g/cm³, the crystallinity was 7%, and the amount of sink was large as 6.5%. Its fusion ratio was 80%. The surface finish was good. Its shrinkage ratio of the molded foam article was 2.2% and thus the dimensional stability was poor. Its thermal dimensional change ratio was large as 10.2% and thus the heat resistance was poor. Its bending strength was 1.32 MPa.

Comparative Example 6

In the same manner as in Example 3, except that the gauge pressure of the steam on cavity-molding was set at 0.07 MPa, the cavity-molding period was set for 15 seconds, and the natural-cooling process was omitted, a molded foam article was obtained. The surface temperature of the mold on cavity-molding was 116° C.

The apparent density of the resulting molded foam article was 0.11 g/cm³, the crystallinity was 5%, and the amount of sink was large as 7.5%. Its fusion ratio was 80%. The surface finish was good. Its shrinkage ratio of the molded foam article was large as 2.6% and thus the dimensional stability was poor. Its thermal dimensional change ratio was large as 12.6% and thus the heat resistance was poor. Its bending strength was 1.31 MPa.

The above results are summarized in Tables 1 to 3.

TABLE 1

|  |  |  | Molding | | Cooling | |
|---|---|---|---|---|---|---|
|  |  | IPA (%) | Surface Temperature of Mold (° C.) | Time (Second) | Time (Second) | Surface Temperature of Mold (° C.) |
| Examples | 1 | 0 | 116 | 15 | 120 | 101 |
|  | 2 | 0 | 122 | 15 | 120 | 105 |
|  | 3 | 1.4 | 116 | 50 | 120 | 101 |

TABLE 1-continued

|  |  | | Molding | | Cooling | |
| --- | --- | --- | --- | --- | --- | --- |
|  |  | IPA (%) | Surface Temperature of Mold (° C.) | Time (Second) | Time (Second) | Surface Temperature of Mold (° C.) |
|  | 4 | 1.4 | 122 | 15 | 120 | 106 |
|  | 5 | 1.4 | 116 | 15 | 600 | 80 |
|  | 6 | 1.4 | 106 | 50 | 600 | 75 |
|  | 7 | 2.5 | 116 | 15 | 150 | 99 |
| Comp. Examples | 1 | 0 | 116 | 15 | — | — |
|  | 2 | 0 | 122 | 120 | — | — |
|  | 3 | 1.4 | 128 | 15 | 60 | 115 |
|  | 4 | 1.4 | 100 | 50 | 600 | 64 |
|  | 5 | 1.4 | 116 | 15 | 15 | 65 |
|  | 6 | 1.4 | 116 | 15 | — | — |

TABLE 2

|  |  | Molded Foam Article | | | |
| --- | --- | --- | --- | --- | --- |
|  |  | Apparent Density (g/cm³) | Crystallinity (%) | Fusion Ratio (%) | Dimensional stability |
| Examples | 1 | 0.13 | 30 | 35 | ○ |
|  | 2 | 0.13 | 31 | 35 | ○ |
|  | 3 | 0.11 | 24 | 85 | ○ |
|  | 4 | 0.11 | 25 | 85 | ○ |
|  | 5 | 0.11 | 28 | 85 | ○ |
|  | 6 | 0.11 | 24 | 80 | ○ |
|  | 7 | 0.11 | 23 | 90 | ○ |
| Comp. Examples | 1 | 0.13 | 18 | 15 | ○ |
|  | 2 | 0.13 | 27 | 20 | ○ |
|  | 3 | 0.11 | 27 | 75 | x |
|  | 4 | 0.11 | 18 | 60 | ○ |
|  | 5 | 0.11 | 7 | 80 | x |
|  | 6 | 0.11 | 5 | 80 | x |

TABLE 3

|  |  | Molded Foam Article | | | |
| --- | --- | --- | --- | --- | --- |
|  |  | Heat Resistance | Bending Strength (MPa) | Sink | Surface Finish |
| Examples | 1 | ○ | 0.72 | ○ | ○ |
|  | 2 | ○ | 0.70 | ○ | ○ |
|  | 3 | ○ | 1.34 | ○ | ○ |
|  | 4 | ○ | 1.33 | ○ | ○ |
|  | 5 | ○ | 1.34 | ○ | ○ |
|  | 6 | ○ | 1.32 | ○ | ○ |
|  | 7 | ○ | 1.52 | ○ | ○ |
| Comp. Examples | 1 | x | 0.48 | ○ | ○ |
|  | 2 | x | 0.52 | ○ | ○ |
|  | 3 | ○ | 1.30 | ○ | x |
|  | 4 | x | 1.22 | ○ | x |
|  | 5 | x | 1.32 | x | ○ |
|  | 6 | x | 1.31 | x | ○ |

EXAMPLE 8

In the same manner as in Example 3, except that all the steam valves and the drain valves were closed after cavity-molding (expanding and fusing) to naturally cool the mold for 30 seconds and the the steam at the gauge pressure of 0.02 MPa was introduced into the mold cavity for 45 seconds, a molded foam article was obtained.

It was confirmed that the apparent density of the resulting molded foam article was 0.11 g/cm³ and the crystallinity was 24%. No sink was found. Its fusion ratio was 85% showing excellent fusion and the surface finish was also good. Its shrinkage ratio of the molded foam article was 0.8% and thus the dimensional stability was good. Its thermal dimensional change ratio was 0.53% and good heat resistance was exhibited. Its bending strength was 1.34 MPa. Re-heating made it possible to obtain the molded foam article of the same quality with the one obtained in Example 3 in a short period of time.

EXAMPLE 9

In the same manner as in Example 6, except that all the steam valves and the drain valves were closed after cavity-molding to naturally cool the mold for 60 seconds and then the steam at the gauge pressure of 0.018 MPa was introduced into the mold cavity for 60 seconds, a molded foam article was obtained.

It was confirmed that the apparent density of the resulting molded foam article was 0.11 g/cm³ and the crystallinity was 24%. No sink was found. Its fusion ratio was 80% showing excellent fusion and the surface finish was also good. Its shrinkage ratio of the molded foam article was 0.8% and thus the dimensional stability was good. Its thermal dimensional change ratio was 0.54% and good heat resistance was exhibited. Its bending strength was 1.32 MPa. Re-heating made it possible to obtain the molded foam article of the same quality with the one obtained in Example 6 in a short period of time.

EXAMPLE 10

In the same manner as in Example 7, except that all the steam valves and the drain valves were closed after cavity-molding to naturally cool the mold for 30 seconds and then the steam at the gauge pressure of 0.02 MPa was introduced into the mold cavity for 90 seconds, a molded foam article was obtained.

It was confirmed that the apparent density of the resulting molded foam article was 0.11 g/cm³ and the crystallinity was 24%. No sink was found. Its fusion ratio was 90% showing excellent fusion and the surface finish was also good. Its shrinkage ratio of the molded foam article was 0.8% and thus the dimensional stability was good. Its thermal dimensional change ratio was 0.52% and good heat resistance was exhibited. Its bending strength was 1.38 MPa. Re-heating made it possible to obtain the molded foam article of the same quality with the one obtained in Example 6 in a short period of time.

EXAMPLE 11

In the same manner as in Example 7, except that 100 parts by weight of only the second resin was used as a crystalline aromatic polyester resin, prepuffs were produced.

The above produced prepuffs was used at the gauge pressure of the steam of 0.07 MPa for 15 seconds for cavity-molding, and after the completion of cavity-molding, all the steam valves and the drain valves were closed to cool naturally the mold for 60 seconds. Thereafter, the steam of 0.02 MPa at gauge pressure was introduced into the mold cavity for 30 seconds for heating again (re-heating) to obtain a molded foam article.

It was confirmed that the apparent density of the resulting molded foam article was 0.11 g/cm³ and the crystallinity was 24%. No sink was found. Its fusion ratio was 95% showing excellent fusion and the surface was also good. Its shrinkage ratio of the molded foam article was 0.8% and thus the dimensional stability was good. Its thermal dimensional change ratio was 0.51% and good heat resistance was exhibited. Its bending strength was 1.46 MPa. Re-heating made is possible to obtain a molded foam article with good heat resistance and good surface finish in a short period of time.

The above results are summarized in Tables 4 to 6.

TABLE 4

| | | | Molding | | Cooling | | Re-heating | |
|---|---|---|---|---|---|---|---|---|
| | | IPA (%) | Surface Temperature of Mold (° C.) | Time (Second) | Time (Second) | Surface Temperature of Mold (° C.) | Surface Temperature of Mold (° C.) | Time (Second) |
| Examples | 8 | 1.4 | 116 | 50 | 30 | 105 | 106 | 45 |
| | 9 | 1.4 | 106 | 50 | 60 | 96 | 105 | 60 |
| | 10 | 2.5 | 116 | 50 | 30 | 105 | 106 | 90 |
| | 11 | 5.8 | 116 | 15 | 60 | 103 | 106 | 30 |

TABLE 5

| | | Molded Foam Article | | | |
|---|---|---|---|---|---|
| | | Apparent Density (g/cm³) | Crystallinity (%) | Fusion Ratio (%) | Dimensional stability |
| Examples | 8 | 0.11 | 24 | 85 | ○ |
| | 9 | 0.11 | 24 | 80 | ○ |
| | 10 | 0.11 | 24 | 90 | ○ |
| | 11 | 0.11 | 24 | 95 | ○ |

TABLE 6

| | | Molded Foam Article | | | |
|---|---|---|---|---|---|
| | | Heat Resistance | Bending Strength (MPa) | Sink | Surface Finish |
| Examples | 8 | ○ | 1.34 | ○ | ○ |
| | 9 | ○ | 1.32 | ○ | ○ |
| | 10 | ○ | 1.38 | ○ | ○ |
| | 11 | ○ | 1.46 | ○ | ○ |

EXAMPLE 12

In the same manner as in Example 3, except that the gauge pressure of the steam on cavity-molding (expanding and fusing) was set at 0.02 MPa, the cavity-molding period was set for 15 seconds and that the mold was cooled naturally for 120 seconds after cavity-molding, a molded foam article was obtained. The surface temperature of the mold on cavity-molding was 106° C.

The apparent density of the resulting molded foam article was 0.11 g/cm³, the crystallinity was 16%, and the amount of sink was small as 2.0%. Its fusion ratio was 60% showing good fusion and the surface finish was also good. Its shrinkage ratio of the molded foam article was small as 0.7% and thus the dimensional stability was good. Its bending strength was 1.46 MPa.

EXAMPLE 13

In the same manner as in Example 12, except that the cavity-molding period was set for 50 seconds, a molded foam article was obtained. The surface temperature of the mold on cavity-molding was 106° C.

The apparent density of the resulting molded foam article was 0.11 g/cm³, the crystallinity was 18%, and the amount of sink was small as 1.0%. Its fusion ratio was 70% showing good fusion and the surface finish was also good. Its shrinkage ratio of the molded foam article was small as 0.8% and thus the dimensional stability was good. Its bending strength was 1.45 MPa.

EXAMPLE 14

In the same manner as in Example 12, except that the gauge pressure of the steam on cavity-molding was set at 0.07 MPa, the cavity-molding period was set for 5 seconds and the mold was cooled naturally for 120 seconds after cavity-molding, a molded foam article was obtained. The surface temperature of the mold on cavity-molding was 116° C., and the surface temperature thereof at the time when the natural-cooling was terminated was 101° C.

The apparent density of the resulting molded foam article was 0.11 g/cm³, the crystallinity was 18%, and the amount of sink was small as 1.0%. Its fusion ratio was 70% showing good fusion and the surface finish was also good. Its shrinkage ratio of the molded foam article was small as 0.7% and thus the dimensional stability was good. Its bending strength was 1.45 MPa.

EXAMPLE 15

In the same manner as in Example 12, except that the gauge pressure of the steam on cavity-molding was set at 0.07 MPa, the cavity-molding period was set for 15 seconds and that the surface temperature of the mold was cooled down to 112° C. in 30 seconds after cavity-molding, a molded foam article was obtained.

The apparent density of the resulting molded foam article was 0.11 g/cm³, the crystallinity was 18%, and the amount of sink was small as 1.0%. Its fusion ratio was 85% showing good fusion and the surface finish was also good. Its shrinkage ratio of the molded foam article was small as 0.7% and thus the dimensional stability was good. Its bending strength was 1.48 MPa.

EXAMPLE 16

In the same manner as in Example 12, except that the gauge pressure of the steam on cavity-molding was set at 0.07 MPa, the cavity-molding period was set for 15 seconds and that the surface temperature of the mold was cooled down to 80° C. in 30 seconds after cavity-molding, a molded foam article was obtained.

The apparent density of the resulting molded foam article was 0.11 g/cm³, the crystallinity was 1%, and the amount of sink was small as 3.0%. Its fusion ratio was 80% showing good fusion and the surface finish was also good. Its shrinkage ratio of the molded foam article was small as 1.0% and thus the dimensional stability was good. Its bending strength was 1.50 MPa.

EXAMPLE 17

In the same manner as in Example 12, except that the gauge pressure of the steam on cavity-molding was set at 1.0 MPa, the cavity-molding period was set for 15 seconds and that the surface temperature of the mold was cooled down to 120° C. in 30 seconds after cavity-molding, a molded foam article was obtained.

The apparent density of the resulting molded foam article was 0.11 g/cm³, the crystallinity was 18%, and the amount of sink was small as 1.0%. Its fusion ratio was 80% showing good fusion and the surface finish was also good. Its shrinkage ratio of the molded foam article was small as 0.8% and thus the dimensional stability was good. Its bending strength was 1.47 MPa.

EXAMPLE 18

The prepuffs produced in Example 7 were used under the gauge pressure of the steam of 0.07 MPa for 50 seconds for cavity-molding, and after the completion of cavity-molding, the mold was cooled naturally for 120 seconds to obtain a molded foam article. The surface temperature of the mold on cavity-molding was 116° C. and the surface temperature thereof at the time when the natural-cooling was terminated was 101° C.

It was confirmed that the apparent density of the resulting molded foam article was 0.11 g/cm³, the crystallinity was 17%, and the sink was small as 1.0%. Its fusion ratio was 90% showing excellent fusion and the surface finish was also good. Its shrinkage ratio of the molded foam article was small as 0.8% and thus the dimensional stability was good. Its bending strength was 1.56 MPa.

The above results are summarized in Tables 7 to 9.

TABLE 8

| | | Molded Foam Article | | | |
|---|---|---|---|---|---|
| | | Apparent Density (g/cm³) | Crystallinity (%) | Fusion Ratio (%) | Dimensional stability |
| Examples | 12 | 0.11 | 16 | 60 | ○ |
| | 13 | 0.11 | 18 | 70 | ○ |
| | 14 | 0.11 | 18 | 70 | ○ |
| | 15 | 0.11 | 18 | 85 | ○ |
| | 16 | 0.11 | 14 | 80 | ○ |
| | 17 | 0.11 | 18 | 80 | ○ |
| | 18 | 0.11 | 17 | 90 | ○ |

TABLE 9

| | | Molded Foam Article | | |
|---|---|---|---|---|
| | | Bending Strength (MPa) | Sink | Surface Finish |
| Examples | 12 | 1.46 | ○ | ○ |
| | 13 | 1.45 | ○ | ○ |
| | 14 | 1.45 | ○ | ○ |
| | 15 | 1.48 | ○ | ○ |
| | 16 | 1.50 | ○ | ○ |
| | 17 | 1.47 | ○ | ○ |
| | 18 | 1.56 | ○ | ○ |

EXAMPLE 19

100 parts by weight of a crystalline aromatic polyester resin(content of IPA unit: 1.8% by weight, Tg: 68.9° C.) synthesized by polycondensation reaction of ethylene glycol, isophthalic acid and terephtalic acid, 0.30 parts by weight of pyromellitic dianhydride as a modifier, 0.03 parts by weight of sodium carbonate as an auxiliary modifier and 0.01 parts by weight of a polytetraflouoroethylene resin as an expansion nucleating agent were charged in an extruder (extruder bore: 65 mm, L/D ratio: 35) and mixed and melted at a screw revolution 50 rpm and a barrel temperature in the range of from of 270 to 290° C. Then 1.0 parts by weight relative to the mixture of butane (n-butane/isobutane=7/3) as a blowing agent was injected into the extruder barrel.

Then the mixture in th molten state was extruded and foamed at the shear speed of 10438 sec⁻¹ (molten resin: 1.2

TABLE 7

| | | | Molding | | Cooling | |
|---|---|---|---|---|---|---|
| | | IPA (%) | Surface Temperature of Mold (° C.) | Time (Second) | Time (Second) | Surface Temperature of Mold (° C.) |
| Examples | 12 | 1.4 | 106 | 15 | 120 | 96 |
| | 13 | 1.4 | 106 | 50 | 120 | 96 |
| | 14 | 1.4 | 116 | 5 | 120 | 101 |
| | 15 | 1.4 | 116 | 15 | 30 | 112 |
| | 16 | 1.4 | 116 | 15 | 30 | 80 |
| | 17 | 1.4 | 122 | 15 | 30 | 120 |
| | 18 | 2.5 | 116 | 50 | 120 | 101 | g/cm³) through each nozzle of a multi nozzle die (15 nozzles having a diameter of 0.8 mm are disposed on a line) connected to the tip portion of the extruder barrel, and then cooled in a cooling water bath.

The cooled strand-like foam (foamed extrudate) was sufficiently dehydrated and then cut into generally cylindrical pieces using a pelletizer to produce prepuffs (primary prepuffs).

The bulk density of the primary prepuffs was 0.140 g/cm$^3$, the average particle diameter was from 1.0 to 1.5 mm, the crystallinity was 4.5%, the open cell ratio was 17.0% and the crystallization peak temperature was 135.4° C.

The primary prepuffs were charged in a sealed container and then impregnated for 12 hours under the condition of temperature of 23° C.±2° C. after injecting a mixed inorganic gas with nitrogen and oxygen (content of nitrogen: 60% of volume) under gauge pressure of 0.5 MPa. Then, the primary prepuffs were taken out from the sealed container and re-expanded by heating with steam/air mixture-heating media(mixed volume ratio 10:90) at the temperature of 68° C. for 10 minutes using a pre-expander equipped with a stirring blade to obtain secondary prepuffs.

It was confirmed that the bulk density of the secondary prepuffs was 0.058 g/cm$^3$, open cell ratio was 17.0% and the crystallinity was 5.8%.

Then, the above secondary prepuffs was matured at the temperature of 23° C.±2° C. under normal pressure for 7 days, after which re-expansion ratio was measured by steam foaming to find that it was expanded 1.6 times and determined maturation was accomplished.

In the same manner as in Example 1, except that the secondary prepuffs were used, a molded foam article was obtained. The surface temperature of the mold on cavity-molding was 116° C. and the surface temperature thereof at the time when the natural cooling was terminated was 102° C.

It was confirmed that the apparent density of the resulting molded foam article was 0.058 g/cm$^3$ and the crystallinity was 23%. No sink was found. Its fusion ratio was 80% showing high fusion and the surface finish was also good. Its shrinkage ratio of the molded foam article was 0.6% and thus the dimensional stability was good. Its thermal dimensional change ratio was 0.58% and good heat resistance was exhibited. Its bending strength was 0.82 MPa.

EXAMPLE 20

In the same manner as in Example 19, except that air was used as the inorganic gas to be impregnated into the primary prepuffs. Secondary prepuffs were produced to obtain a molded foam article.

It was confirmed that the bulk density of the secondary prepuffs was 0.060 g/cm$^3$, open cell ratio was 16.0% and the crystallinity was 5.9%.

The apparent density of the resulting molded foam article was 0.060 g/cm$^3$ and the crystallinity was 23%. No sink was found. Its fusion ratio was 80% showing high fusion and the surface finish was also good. Its shrinkage ratio of the molded foam article was 0.6% and thus the dimensional stability was good. Its thermal dimensional change ratio was 0.57% and good heat resistance was exhibited. Its bending strength was 0.83 MPa.

EXAMPLE 21

In the same manner as in Example 19, except that 100% nitrogen gas was used as the inorganic gas to be impregnated into the primary prepuffs. Secondary prepuffs were produced to obtain a molded foam article.

It was confirmed that the bulk density of the secondary prepuffs was 0.060 g/cm$^3$, open cell ratio was 16.5% and the crystallinity was 5.7%.

The apparent density of the resulting molded foam article was 0.060 g/cm$^3$ and the crystallinity was 23%. No sink was found. Its fusion ratio was 80% showing high fusion and the surface finish was also good. Its shrinkage ratio of the molded foam article was 0.6% and thus the dimensional stability was good. Its thermal dimensional change ratio was 0.58% and good heat resistance was exhibited. Its bending strength was 0.83 MPa.

EXAMPLE 22

In the same manner as in Example 20, except that the pressure on impregnating with the inorganic gas was set at 1.0 MPa at gauge pressure, secondary prepuffs were produced to obtain a molded foam article.

It was confirmed that the bulk density of the secondary prepuffs was 0.038 g/cm$^3$, open cell ratio was 18.5% and the crystallinity was 6.2%.

The apparent density of the resulting molded foam article was 0.038 g/cm$^3$ and the crystallinity was 25%. No sink was found. Its fusion ratio was 75% showing high fusion and the surface finish was also good. Its shrinkage ratio of the molded foam article was 1.2% and thus the dimensional stability was good. Its thermal dimensional change ratio was 0.60% and good heat resistance was exhibited. Its bending strength was 0.54 MPa.

EXAMPLE 23

In the same manner as in Example 20, except that the pressure on impregnating with the inorganic gas was set at 3.0 MPa at gauge pressure, secondary prepuffs were produced to obtain a molded foam article.

It was confirmed that the bulk density of the secondary prepuffs was 0.030 g/cm$^3$, open cell ratio was 20.0% and the crystallinity was 6.8%.

The apparent density of the resulting molded foam article was 0.030 g/cm$^3$ and the crystallinity was 26%. No sink was found. Its fusion ratio was 70% showing high fusion and the surface finish was also good. Its shrinkage ratio of the molded foam article was 1.4% and thus the dimensional stability was good. Its thermal dimensional change ratio was 0.59% and good heat resistance was exhibited. Its bending strength was 0.51 MPa.

EXAMPLE 24

In the same manner as in Example 20, except that the heating temperature at re-expanding was set at 57° C., secondary prepuffs were produced to obtain a molded foam article.

It was confirmed that the bulk density of the secondary prepuffs was 0.063 g/cm$^3$, open cell ratio was 16.0% and the crystallinity was 4.4%.

The apparent density of the resulting molded foam article was 0.063 g/cm$^3$ and the crystallinity was 23%. No sink was found. Its fusion ratio was 80% showing high fusion and the surface finish was also good. Its shrinkage ratio of the molded foam article was 0.7% and thus the dimensional stability was good. Its thermal dimensional change ratio was 0.57% and good heat resistance was exhibited. Its bending strength was 0.84 MPa.

EXAMPLE 25

In the same manner as in Example 20, except that the heating temperature at re-expanding was set at 88° C., secondary prepuffs were produced to obtain a molded foam article.

It was confirmed that the bulk density of the secondary prepuffs was 0.061 g/cm³, open cell ratio was 16.5% and the crystallinity was 6.5%.

The apparent density of the resulting molded foam article was 0.061 g/cm³ and the crystallinity was 24%. No sink was found. Its fusion ratio was 80% showing high fusion and the surface finish was also good. Its shrinkage ratio of the molded foam article was 0.6% and thus the dimensional stability was good. Its thermal dimensional change ratio was 0.58% and good heat resistance was exhibited. Its bending strength was 0.82 MPa.

EXAMPLE 26

In the same manner as in Example 20, except that the heating period at re-expanding was set for 5 minutes, secondary prepuffs were produced to obtain a molded foam article.

It was confirmed that the bulk density of the secondary prepuffs was 0.061 g/cm³, open cell ratio was 16.0% and the crystallinity was 5.3%.

The apparent density of the resulting molded foam article was 0.061 g/cm³ and the crystallinity was 23%. No sink was found. Its fusion ratio was 80% showing high fusion and the surface finish was also good. Its shrinkage ratio of the molded foam article was 0.6% and thus the dimensional stability was good. Its thermal dimensional change ratio was 0.57% and good heat resistance was exhibited. Its bending strength was 0.83 MPa.

EXAMPLE 27

In the same manner as in Example 20, except that the heating period at re-expanding was set for 2 minutes, secondary prepuffs were produced to obtain a molded foam article.

It was confirmed that the bulk density of the secondary prepuffs was 0.061 g/cm³, open cell ratio was 15.0% and the crystallinity was 5.1%.

The apparent density of the resulting molded foam article was 0.061 g/cm³ and the crystallinity was 23%. No sink was found. Its fusion ratio was 80% showing high fusion and the surface finish was also good. Its shrinkage ratio of the molded foam article was 0.6% and thus the dimensional stability was good. Its thermal dimensional change ratio was 0.57% and good heat resistance was exhibited. Its bending strength was 0.83 MPa.

The above results are summarized in the Tables 10 to 12.

TABLE 11

| | | Molded Foam Article | | | |
|---|---|---|---|---|---|
| | | Apparent Density (g/cm³) | Crystallinity (%) | Fusion Ratio (%) | Dimensional stability |
| Examples | 19 | 0.058 | 23 | 80 | ○ |
| | 20 | 0.060 | 23 | 80 | ○ |
| | 21 | 0.060 | 23 | 80 | ○ |
| | 22 | 0.038 | 25 | 75 | ○ |
| | 23 | 0.030 | 26 | 70 | ○ |
| | 24 | 0.063 | 23 | 80 | ○ |
| | 25 | 0.061 | 24 | 80 | ○ |
| | 26 | 0.061 | 23 | 80 | ○ |
| | 27 | 0.061 | 23 | 80 | ○ |

TABLE 12

| | | Molded Foam Article | | | |
|---|---|---|---|---|---|
| | | Heat Resistance | Bending Strength (MPa) | Sink | Surface Finish |
| Examples | 19 | ○ | 0.82 | ○ | ○ |
| | 20 | ○ | 0.83 | ○ | ○ |
| | 21 | ○ | 0.83 | ○ | ○ |
| | 22 | ○ | 0.54 | ○ | ○ |
| | 23 | ○ | 0.51 | ○ | ○ |
| | 24 | ○ | 0.84 | ○ | ○ |
| | 25 | ○ | 0.82 | ○ | ○ |
| | 26 | ○ | 0.83 | ○ | ○ |
| | 27 | ○ | 0.83 | ○ | ○ |

EXAMPLE 28

In the same manner as in Example 1, except that the same primary prepuffs as those produced in Example 19 were charged in a sealed container and then a mixed inorganic gas with nitrogen and oxygen (content of nitrogen: 60% of volume) was injected therein at gauge pressure of 0.5 MPa to impregnate the primary prepuffs for 2 hours under the condition of temperature of 20° C. and to fill the mold cavity with the same for cavity-molding (expanding and fusing), a molded foam article was obtained. The surface temperature of the mold on cavity-molding was 116° C. and the surface temperature thereof was 102° C. at the time when the natural-cooling was terminated.

The apparent density of the resulting molded foam article was 0.14 g/cm³ and the crystallinity was 14%. The sink was small as 3.0%. Its fusion ratio was 70% showing high fusion

TABLE 10

| | | Pressure on Impregnating Gas | | Re-expanding | | Secondary Prepuff | | |
|---|---|---|---|---|---|---|---|---|
| | | Gas | Pressure (Mpa) | Temperature (° C.) | Time (Minute) | Bulk Density (g/cm³) | Open Cell Ratio (%) | Crystallinity (%) |
| Examples | 19 | 60% N₂ | 0.5 | 68 | 10 | 0.058 | 17.0 | 5.8 |
| | 20 | Air | 0.5 | 68 | 10 | 0.060 | 16.0 | 5.9 |
| | 21 | 100% N₂ | 0.5 | 68 | 10 | 0.060 | 16.5 | 5.7 |
| | 22 | Air | 1.0 | 68 | 10 | 0.038 | 18.5 | 6.2 |
| | 23 | Air | 3.0 | 68 | 10 | 0.030 | 20.0 | 6.8 |
| | 24 | Air | 0.5 | 57 | 10 | 0.063 | 16.0 | 4.4 |
| | 25 | Air | 0.5 | 88 | 10 | 0.061 | 16.5 | 6.5 |
| | 26 | Air | 0.5 | 68 | 5 | 0.061 | 16.0 | 5.3 |
| | 27 | Air | 0.5 | 68 | 2 | 0.061 | 16.0 | 5.1 |

EXAMPLE 29

In the same manner as in Example 28, except that air was used as the inorganic gas for the vapor phase impregnation, a molded foam article was obtained.

The apparent density of the resulting molded foam article was 0.14 g/cm$^3$ and the crystallinity was 14%. The sink was small as 3.0%. Its fusion ratio was 70% showing high fusion and the surface finish was also good. Its shrinkage ratio of the molded foam article was 0.1% and thus the dimensional stability was especially good. Its bending strength was 1.47 MPa.

EXAMPLE 30

In the same manner as in Example 28, except that carbon dioxide gas was used as the inorganic gas for the vapor phase impregnation, a molded foam article was obtained.

The apparent density of the resulting molded foam article was 0.14 g/cm$^3$ and the crystallinity was 70%. The sink was small as 3.0%. Its fusion ratio was 70% showing high fusion and the surface finish was also good. Its shrinkage ratio of the molded foam article was 0.1% and thus the dimensional stability was especially good. Its bending strength was 1.46 MPa.

EXAMPLE 31

In the same manner as in Example 20, except that the produced secondary prepuffs were charged in a sealed container and then a mixed inorganic gas with nitrogen and oxygen (content of nitrogen: 60% of volume) was injected therein at gauge pressure of 0.5 MPa to impregnate the secondary prepuffs for 2 hours under the condition of temperature of 20° C., after which the mold cavity was filled with the same immediately, a molded foam article was obtained.

The apparent density of the resulting molded foam article was 0.058 g/cm$^3$ and the crystallinity was 18%. The sink was small as 1.0%. Its fusion ratio was 70% showing high fusion and the surface finish was also good. Its shrinkage ratio of the molded foam article was 0.2% and thus the dimensional stability was especially good. Its bending strength was 0.88 MPa.

EXAMPLE 32

In the same manner as in Example 31, except that air was used as the inorganic gas for the vapor phase impregnation, a molded foam article was obtained.

The apparent density of the resulting molded foam article was 0.058 g/cm$^3$ and the crystallinity was 18%. The sink was small as 1.0%. Its fusion ratio was 70% showing high fusion and the surface finish was also good. Its shrinkage ratio of the molded foam article was 0.2% and thus the dimensional stability was especially good. Its bending strength was 0.88 MPa.

EXAMPLE 33

In the same manner as in Example 31, except that carbon dioxide gas was used as the inorganic gas for the vapor phase impregnation, a molded foam article was obtained.

The apparent density of the resulting molded foam article was 0.058 g/cm$^3$ and the crystallinity was 18%. The sink was small as 1.0%. Its fusion ratio was 70% showing high fusion and the surface finish was also good. Its shrinkage ratio of the molded foam article was 0.2% and thus the dimensional stability was especially good. Its bending strength was 0.88 MPa.

EXAMPLE 34

In the same manner as in Example 32, except that the gauge pressure of the inorganic gas applied for the vapor phase impregnation was set at 0.2 MPa, a molded foam article was obtained.

The apparent density of the resulting molded foam article was 0.058 g/cm$^3$ and the crystallinity was 19%. The sink was small as 0.5%. Its fusion ratio was 75% showing high fusion and the surface finish was also good. Its shrinkage ratio of the molded foam article was 0.2% and thus the dimensional stability was especially good. Its bending strength was 0.86 MPa.

EXAMPLE 35

In the same manner as in Example 32, except that at gauge pressure of the inorganic gas applied for the vapor phase impregnation was set at 2.0 MPa, a molded foam article was obtained.

The apparent density of the resulting molded foam article was 0.058 g/cm$^3$ and the crystallinity was 16%. The sink was small as 2.0%. Its fusion ratio was 60% showing high fusion and the surface finish was also good. Its shrinkage ratio of the molded foam article was 0.2% and thus he dimensional stability was especially good. Its bending strength was 0.87 MPa.

EXAMPLE 36

In the same manner as in Example 32, except that the gauge pressure of the inorganic gas applied for the vapor phase impregnation was set at 0.05 MPa, a molded foam article was obtained.

The apparent density of the resulting molded foam article was 0.058 g/cm$^3$ and the crystallinity was 21%. No sink was found. Its fusion ratio was 80% showing high fusion and the surface finish was also good. Its shrinkage ratio of the molded foam article was 0.2% and thus the dimensional stability was especially good. Its bending strength was 0.87 MPa.

The above results are summarized in Tables 13 to 15.

TABLE 13

| | | Prepuff | | Vapor Phase Impregnation | | |
|---|---|---|---|---|---|---|
| | | Bulk Density (g/cm³) | Crystallinity (%) | Gas | Pressure (Mpa) | Temperature (° C.) | Time (Hour) |
| Examples | 28 | 0.14 | 4.5 | 60% N₂ | 0.5 | 20 | 2 |
| | 29 | 0.14 | 4.5 | Air | 0.5 | 20 | 2 |
| | 30 | 0.14 | 4.5 | Carbon Dioxide Gas | 0.5 | 20 | 2 |
| | 31 | 0.058 | 5.8 | 60% N₂ | 0.5 | 20 | 2 |
| | 32 | 0.058 | 5.8 | Air | 0.5 | 20 | 2 |
| | 33 | 0.058 | 5.8 | Carbon Dioxide Gas | 0.5 | 20 | 2 |
| | 34 | 0.058 | 5.8 | Air | 0.2 | 20 | 2 |
| | 35 | 0.058 | 5.8 | Air | 2.0 | 20 | 2 |
| | 36 | 0.058 | 5.8 | Air | 0.05 | 20 | 2 |

TABLE 14

| | | Molded Foam Article | | | |
|---|---|---|---|---|---|
| | | Apparent Density (g/cm³) | Crystallinity (%) | Fusion Ratio (%) | Dimensional stability |
| Examples | 28 | 0.14 | 14 | 70 | ◉ |
| | 29 | 0.14 | 14 | 70 | ◉ |
| | 30 | 0.14 | 14 | 70 | ◉ |
| | 31 | 0.058 | 18 | 70 | ◉ |
| | 32 | 0.058 | 18 | 70 | ◉ |
| | 33 | 0.058 | 18 | 70 | ◉ |
| | 34 | 0.058 | 19 | 75 | ◉ |
| | 35 | 0.058 | 16 | 60 | ◉ |
| | 36 | 0.058 | 21 | 80 | ◉ |

TABLE 15

| | | Molded Foam Article | | |
|---|---|---|---|---|
| | | Bending Strength (MPa) | Sink | Surface Finish |
| Examples | 28 | 1.46 | ○ | ○ |
| | 29 | 1.47 | ○ | ○ |
| | 30 | 1.46 | ○ | ○ |
| | 31 | 0.88 | ○ | ○ |
| | 32 | 0.88 | ○ | ○ |
| | 33 | 0.88 | ○ | ○ |
| | 34 | 0.86 | ○ | ○ |
| | 35 | 0.87 | ○ | ○ |
| | 36 | 0.87 | ○ | ○ |

What we claim is:

1. A process for producing a crystalline aromatic polyester resin molded foam article, which comprises molding crystalline aromatic polyester resin prepuffs using male and female mold members of a mold assembly comprising the steps of:
   (1) filling a mold cavity, which is formed by closing the male and female mold members, with the crystalline aromatic polyester resin prepuffs;
   (2) heating an interior surface of the mold to a temperature not less than (Tg+35) and no greater than (Tg+57)°C. (Tg being a glass transition temperature of the crystalline aromatic polyester resin prepuffs), thereby to mold the filled prepuffs;
   (3) cooling the surface of the mold to a temperature not lower than Tg for a period of at least 20 seconds while holding the molded form article in the mold as it is; and
   (4) after step (3), cooling the surface of the mold lower than Tg.

2. The process for producing a crystalline aromatic polyester resin molded foam article according to claim 1, wherein said heating is conducted using steam.

3. A process for producing a crystalline aromatic polyester resin molded foam article, which comprises molding crystalline aromatic polyester resin prepuffs using male and female mold members of a mold assembly comprising the steps of:
   (1) filling a mold cavity, which is formed by closing the male and female mold members, with the crystalline aromatic polyester resin prepuffs;
   (2) heating an interior surface of the mold to a temperature in a range of from (Tg+35) to (Tg+57)°C. (Tg being a glass transition temperature of the crystalline aromatic polyester resin prepuffs), thereby to mold the filled prepuffs;
   (3) cooling the surface of the mold to a temperature not lower than Tg for a period of at least 20 seconds while holding the molded form article in the mold as it is; and
   (4) removing the molded form article from the mold, after finally cooling the surface of the mold lower than Tg, wherein a step (3a) is added between steps (3) and (4):
      (3a) heating the surface of the mold again to the temperature within a range of from (Tg+20) to (Tg+57)°C., accelerating crystallization of the molded foam.

4. The process for producing a crystalline aromatic polyester resin molded foam article according to claim 2, wherein a step (3a) is added between steps (3) and (4):
   (3a) heating the surface of the mold again to the temperature within a range of from (Tg+20) to (Tg+57)°C., accelerating crystallization of the molded foam.

5. The process for producing a crystalline aromatic polyester resin molded foam article according to any one of claim 1, 2, 3, or 4, further comprising prior to step (1) impregnating the prepuffs with an inorganic gas at gauge pressure of 0.01 to 5 MPa.

6. The process for producing a crystalline aromatic polyester resin molded foam article according to claim 5, wherein air is used as the inorganic gas.

7. The process for producing a crystalline aromatic polyester resin molded foam article according to any one of claim 1, 2, 3, or 4, further comprising prior to step (1):

re-expanding of the prepuffs at least one time by impregnating the prepuffs with a gas at gauge pressure of 0.1 to 5 MPa at a temperature lower than Tg for 1 to 24 hours and then expanding the prepuffs at a temperature of 55 to 90° C. in 12 minutes or less.

8. The process for producing a crystalline aromatic polyester resin molded foam article according to claim 7, wherein air is used as the gas.

9. The process for producing a crystalline aromatic polyester resin molded foam article according to claim 7, wherein steam is used as a heating medium for re-expanding.

10. The process for producing a crystalline aromatic polyester resin molded foam article according to claim 8, wherein steam is used as a heating medium for re-expanding.

11. The process for producing a crystalline aromatic polyester resin molded foam article according to claim 7, wherein the re-expanded prepuffs are further subjected to impregnating with an inorganic gas at gauge pressure of 0.01 to 5 Mpa prior to step (1).

12. The process for producing a crystalline aromatic polyester resin molded foam article according to claim 8, wherein the re-expanded prepuffs are further subjected to impregnating with an inorganic gas at gauge pressure of 0.01 to 5 Mpa prior to step (1).

13. The process for producing a crystalline aromatic polyester resin molded foam article according to claim 9, wherein the re-expanded prepuffs are further subjected to impregnating with an inorganic gas at gauge pressure of 0.01 to 5 Mpa prior to step (1).

14. The process for producing a crystalline aromatic polyester resin molded foam article according to claim 10, wherein the re-expanded prepuffs are further subjected to impregnating with an inorganic gas at gauge pressure of 0.01 to 5 Mpa prior to step (1).

15. The process for producing a crystalline aromatic polyester resin molded foam article according to claim 11, wherein air is used as the inorganic gas.

16. The process for producing a crystalline aromatic polyester resin molded foam article according to claim 12, wherein air is used as the inorganic gas.

17. The process for producing a crystalline aromatic polyester resin molded foam article according to claim 13, wherein air is used as the inorganic gas.

18. The process for producing a crystalline aromatic polyester resin molded foam article according to claim 14, wherein air is used as the inorganic gas.

* * * * *